Dec. 8, 1942.                L. D. PRICE                2,304,596
MEASURING DEVICE
Filed May 29, 1941
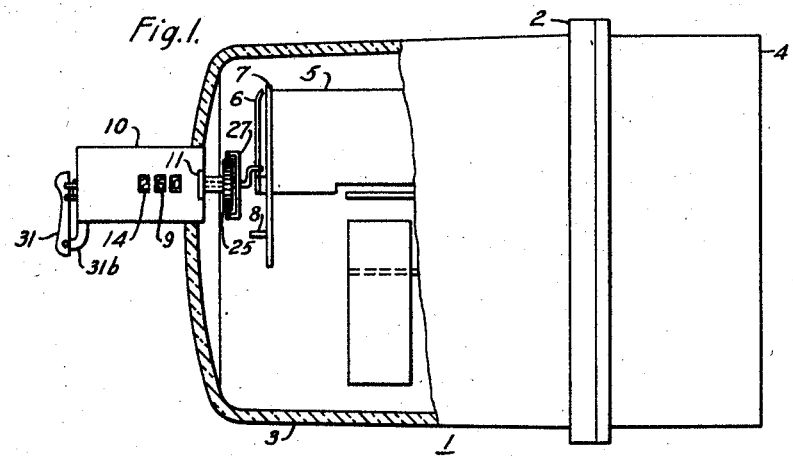
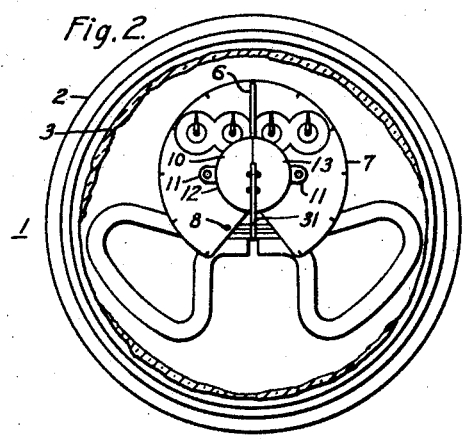
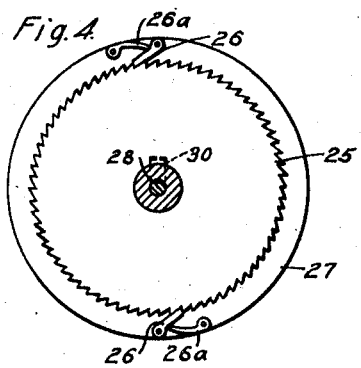
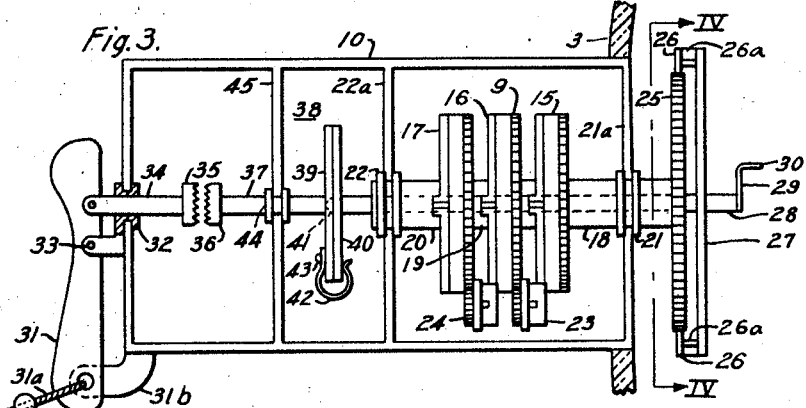
WITNESSES:
INVENTOR
Leslie D. Price.
BY
ATTORNEY Patented Dec. 8, 1942

2,304,596

UNITED STATES PATENT OFFICE 2,304,596

MEASURING DEVICE

Leslie D. Price, Fair Lawn, N. J., assignor to Westinghouse Electric & Manufacturing Company, East Pittsburgh, Pa., a corporation of Pennsylvania Application May 29, 1941, Serial No. 395,812

5 Claims. (Cl. 171—34)

This invention relates to measuring instruments, and it has particular relation to cumulative or registering maximum demand measuring instruments.

Indicating instruments are widely employed in all fields for the purpose of measuring variable quantities. Although such instruments are highly desirable from the standpoint of simplicity and economy, they are objectionable for the reason that no record is left of their readings. For example, reference may be made to maximum demand measuring devices employed for measuring electrical energy. A maximum demand measuring device of the indicating type is employed for the purpose of indicating the maximum demand of electrical energy over a billing period which generally is of one month duration. At the end of each billing period, a meter reader notes the reading of the maximum demand measuring device and resets the device for a new billing period. This resetting operation erases the maximum demand indication from the device.

In order to provide a record of the reading of an indicating measuring device such as a maximum demand device, it has been proposed that a cumulative register be included in the maximum demand device. A cumulative maximum demand device of this type which is widely employed is illustrated in Patent 2,259,314.

Although a cumulative maximum demand device is entirely satisfactory in operation, its general adoption has been retarded because of the large variety of maximum demand devices. Three distinct types of commercially employed maximum demand devices are disclosed in Patents Nos. 1,417,695, 2,003,016, and 2,047,376 which are assigned to the Westinghouse Electric & Manufacturing Company. These patents show, respectively, maximum demand devices which are identified as time lagged thermal maximum demand devices, mechanical time lagged maximum demand devices and block interval maximum demand devices. If these three devices are offered in both indicating and cumulative types it follows that six distinct styles must be manufactured and stocked.

In accordance with the invention, a separate record device or register is employed for providing a record of the reading of an indicating instrument such as a maximum demand device. This register is a complete unit which may be associated with an indicating instrument of any type. For a maximum demand device the register may be associated conveniently with the cover generally employed for enclosing the maximum demand device. Preferably, the operation of the register is controlled by the resetting means employed for resetting the maximum demand device. In other words, the resetting operation automatically sets up on the register the reading of the maximum demand device.

It is, therefore, an object of the invention to provide improved record means for indicating instruments.

It is a further object of the invention to provide a unit for association with an indicating maximum demand device which includes means for resetting the maximum demand device and means for registering the reading of the maximum demand device immediately prior to the resetting operation.

It is a still further object of the invention to provide a resetting and registering unit mounted on the cover of a maximum demand measuring device.

Other objects of the invention will be apparent from the following description taken in conjunction with the accompanying drawing, in which:

Figure 1 is a view in side elevation with parts broken away of a measuring instrument embodying the invention, Fig. 2 is a view in front elevation with parts broken away of the measuring instrument shown in Fig. 1, Fig. 3 is a view in section of a registering and resetting unit illustrated in Figs. 1 and 2, and Fig. 4 is a detail view taken along the line IV—IV of Fig. 3.

Referring to the drawing, Fig. 1 shows a measuring instrument which may take the form of a conventional watthour meter 1. This watthour meter is enclosed in a suitable casing 2 which may include a detachable cover 3. Generally, the cover 3 is of glass. The watthour meter illustrated in Fig. 1 is of the detachable type and is detachably mounted on a socket 4. A detailed description of the watthour meter together with its case and socket may be found by reference to the Bradshaw et al. patent 1,969,499 which is assigned to the Westinghouse Electric & Manufacturing Company.

For indicating the maximum demand of electrical energy occurring in a circuit with which the watthour meter 1 is associated, a maximum demand device 5 may be included in the casing 2 of the watthour meter. This maximum demand device may be of a conventional construction such as one of the devices illustrated in the aforesaid Patents 1,417,695, 2,003,016 and 2,047,376. As illustrated, the maximum demand device 5 includes a demand pointer 6 which is actuated over a scale carried by a dial plate 7 in accordance with the maximum demand. The zero or initial position of the pointer 6 is defined by a stop pin 8 carried by the dial plate 7.

As well understood in the art, the demand pointer 6 is actuated over the dial plate 7 and retains the most advanced position to which it is actuated. Consequently, at the end of a billing period, the position of the demand pointer 6 indicates on its associated scale the maximum demand occurring during the billing period. At the end of each billing period, the maximum demand pointer 6 is reset into engagement with its stop 8.

In order to preserve a record of the maximum demand indicated by the demand pointer 6 immediately prior to a resetting operation thereof, a register 9 is associated with the resetting mechanism for the demand pointer to form a register unit 10. This register unit may be mounted in any desired manner relative to the maximum demand device but in the specific embodiment of Fig. 1, the unit is mounted on the cover 3 which detachably encloses the watthour meter 1. Such mounting may be effected in any desired manner. For example, the unit 10 may be provided with ears 11 through which suitable rivets or bolts pass for the purpose of attaching the unit to the cover 3. The unit 10 may include a suitable casing divided into two suitably attached halves 12 and 13 for the purpose of facilitating assembly of the unit. This casing may have windows 14 through which the register 9 is visible. A suitable construction for the unit 10 is illustrated in detail in Fig. 3.

In Fig. 3, the register 9 is illustrated as a cyclometer type register having three cyclometer wheels 15, 16 and 17. It will be understood, however, that the structure of the register may vary appreciably and the cyclometer type register is selected merely for the purpose of illustration. The cyclometer wheels are mounted on sleeves 18, 19 and 20 which are rotatable relative to each other and to the casing of the unit 10. End play of the sleeves may be restricted by providing the end sleeves with flanges 21 and 22 to engage webs 21a and 22a formed in the casing of the unit 10. The cyclometer wheel 15 may be designated a unit wheel which, at the end of each revolution, through a suitable coupling gear 23 rotates the cyclometer wheel 16 one-tenth of a revolution. Similarly, at the end of one revolution of the cyclometer wheel 16 which may be termed a "ten wheel," the cyclometer wheel 17 is rotated one-tenth of a revolution through a coupling gear 24. Since the construction of cyclometer registers is well known in the art, it is believed that a further description of the construction and operation of the register 9 is unnecessary.

Actuation of the register 9 is controlled through a ratchet wheel 25 which is fixed to the sleeve 18. Rotation of the ratchet wheel is governed by one or more pawls 26 which are carried by a disk 27 and which are urged against the ratchet wheel by suitable springs 26a. By reference to Fig. 4, it will be noted that the disk 27 may turn freely relative to the ratchet wheel in a clockwise direction. However, rotation of the disk 27 in a counterclockwise direction operates through the pawls 26 to rotate the ratchet wheel 25 and the register 9 associated with the ratchet wheel.

The range of movement of the disk 27 is determined by the demand pointer 6. To this end, the disk 27 is fixed to a shaft 28 which passes through the sleeves 18, 19 and 20 and which is freely rotatable relative to the sleeves and to the casing of the unit 10. The shaft 28 carries a crank arm 29 having a forked end 30 for engaging the demand pointer 6. Consequently, the crank arm 29, the shaft 28 and the disk 27 rotate in unison with the demand pointer 6. As the demand pointer advances over its scale, the pawls 26 ride freely over the teeth of the associated ratchet wheel 25. Therefore, no motion is imparted to the ratchet wheel 25 or to the register 9 associated therewith. However, when the demand pointer 6 is returned into engagement with its stop 8, the pawls 26 engage the teeth of the ratchet wheel 25 to carry the ratchet wheel with the disk 27. The rotation of the ratchet wheel 25, in turn, operates the register 9.

For resetting the demand pointer 6, a resetting lever 31 is associated with the unit 10. This lever may be pivotally mounted on a bushing 32 which is rotatably carried by the unit 10. This bushing 32 carries a pin 33 on which the lever 31 is mounted.

The lever 31 also is pivoted to a shaft 34 which slidably passes through the bushing 32. Rotation of the lever 31 in a clockwise direction as viewed in Fig. 3 urges the shaft 34 through the bushing 32 to bring the reciprocable plate 35 of a jaw clutch or coupling into engagement with the cooperating plate 36 of the jaw clutch or coupling. Sufficient play in the pivots of the lever 31 may be provided for such operation thereof. Rotation of the lever 31 in a plane transverse to the plane of the drawing then operates to rotate the plate 36 of the jaw clutch or coupling. The plate 36 is carried by a shaft 37 which is rotatably mounted in the casing of the unit 10. This shaft 37 is coupled to the shaft 28 to transmit rotation of the resetting lever 31 through the crank arm 29 to the pointer 6.

Preferably, a friction clutch 38 or other suitable means is provided for permitting rotation of the lever 31 relative to the demand pointer 6 after the demand pointer 6 has been reset to its zero position in engagement with the stop 8. The friction clutch 38 may take the form of a plate 39 carried by the shaft 37 and a plate 40 carried by the shaft 28. To assist in maintaining alignment of the shafts, the plate 40 may include a conical projection 41 which is received in a similarly shaped recess in the plate 39. The plates 39 and 40 of the clutch 38 may be urged together in any suitable manner as by a U-shaped spring 42 which is suitably attached to one of the plates as by means of a rivet 43 passing through the spring and the plate 39. To restrict end play of the shaft 37, flanges 44 may be formed thereon for cooperation with a web 45 provided in the casing of the unit 10.

From the foregoing description it is believed that the operation of the register unit as a whole will be understood. During a billing period, the demand pointer 6 is advanced to a position corresponding to the maximum demand for the billing period. The advance of the demand pointer 6 carries with it the crank arm 29, the shaft 28 and the disk 27. As previously pointed out, the pawls 26 ride freely over the teeth of the ratchet wheel 25. Therefore, no operation of the register 9 results from the advance of the demand pointer 6.

At the end of the billing period, a meter reader observes the reading of the demand pointer 6. The meter reader then breaks a seal 31a provided for the lever 31 and pivots the lever 31 about the pin 33 for the purpose of engaging the plates 35 and 36 of the jaw clutch or coupling. This seal may fasten the lever to an arm 31b carried by the casing of the unit 10. The meter reader next rotates the lever 31 in a counterclockwise direction, as viewed in Fig. 2, for the purpose of resetting the demand pointer 6. The rotation of the lever 31 operates through the shafts 37 and 28 and the crank arm 29 to return the demand pointer 6 into engagement with the stop pin 8. The rotation of the lever 31 also operates through the disk 27 and the pawls 26 to rotate the ratchet wheel 25 and the register 9. Consequently, the reading represented by the demand pointer prior to the resetting operation is transferred to the register 9. By subtracting the initial reading of the register 9 from the new reading thereof, the maximum demand for any billing period may be ascertained during a following billing period.

When the demand pointer 6 reaches the stop pin 8, the resetting lever 31 may not be in its sealing position. However, continued rotation of the resetting lever carries the lever to its sealing position without disturbing the pointer 6 or the register 9 for the reason that the plates 39 and 40 of the clutch 38 slip. When the resetting lever 31 has reached its sealing position, it is rotated about the pin 33 to separate the coupling plates 35 and 36. This conditions the measuring instrument for operating during the next billing period.

It will be noted that the ratchet mechanism permits operation of the register for only one direction of rotation of the maximum demand pointer 6. Although the register may be actuated during either the advancing movement or the resetting movement of the pointer, preferably the actuation occurs during the resetting movement as herein set forth. With such actuation the meter reader rather than the watt-hour meter supplies the work necessary for operating the register.

Since the invention is susceptible to numerous modifications, the invention is to be restricted only by the appended claims.

I claim as my invention:

1. In a measuring device for measuring a variable quantity, a maximum demand device, a detachable cover for said maximum demand device, and a register attachment mounted on said cover for operative association with said maximum demand device as a complete unit when said cover is in attached position, said register attachment including register means, operating means, means for coupling said operating means to said maximum demand device for effecting a resetting operation of said maximum demand device, means responsive to operation of said operating means for actuating said register means in accordance with the quantity measured by said maximum demand device, and means for interrupting the effective coupling between said operating means and said maximum demand device when said maximum demand device is reset to a predetermined condition.

2. In a measuring device for measuring a variable quantity, a measuring instrument including an element designed for a first movement in accordance with said variable quantity to represent the value thereof; resetting means operable to apply a second movement to said element for restoring said element to a predetermined position, said resetting means including auxiliary means for preserving the value of said variable quantity represented by said element immediately prior to a resetting operation thereof, and means effectively coupling said auxiliary means to said element for actuation in accordance with the magnitude of only one of said movements of said element; and means supporting said resetting means for attachment and detachment as a unit relative to said measuring instrument.

3. In a measuring device for measuring a variable quantity, a measuring instrument including an element designed for a first movement in accordance with said variable quantity to represent the value thereof; a cover for said measuring instrument; resetting means mounted on said cover and operable exteriorly thereof to apply a second movement to said element for restoring said element to a predetermined position, said resetting means including auxiliary means for preserving the value of said variable quantity represented by said element immediately prior to a resetting operation thereof, and means effectively coupling said auxiliary means to said element for actuation in accordance with the magnitude of only one of said movements of said element; and means securing said cover and resetting means as a unit to said measuring instrument.

4. In a measuring device for measuring a variable quantity, a maximum demand measuring instrument including an element designed for a first movement in accordance with the maximum demand of said variable quantity to represent the value thereof; a cover for said measuring instrument; resetting means mounted on said cover and operable exteriorly thereof to apply a second movement to said element for restoring said element to a predetermined position, said resetting means including register means for preserving the value of said variable quantity represented by said element immediately prior to a resetting operation thereof, and means effectively coupling said register means to said element for actuation in accordance with the magnitude of only one of said movements of said element; means securing said cover and resetting means as a unit to said measuring instrument, and means for interrupting the effective coupling of said register means to said element in response to operation of said resetting means after said element has been restored to said predetermined position.

5. In a measuring device for measuring a variable quantity, a maximum demand measuring instrument including an element designed for a first movement in accordance with the maximum demand of said variable quantity to represent the value thereof; a cover for said measuring instrument; resetting means mounted on said cover and operable exteriorly thereof to apply a second movement to said element for restoring said element to a predetermined position, said resetting means including register means for preserving the value of said variable quantity represented by said element immediately prior to a resetting operation thereof, an operating member positioned exteriorly of said cover, coupling means coupling said operating member to said element for urging said element from a measuring position to said predetermined position in response to a resetting operation of said operating member, means for interrupting the coupling between said operating member and said element when said element arrives at said predetermined position to permit excess operation of said operating member, and means coupling said register means to said operating means for actuation thereby only during the resetting operation of said element from a measuring position to said predetermined position; and means securing said cover and resetting means as a unit to said measuring instrument.

LESLIE D. PRICE.